(12) United States Patent
Hiatt et al.

(10) Patent No.: US 7,794,272 B1
(45) Date of Patent: Sep. 14, 2010

(54) SERIAL BUS POWER CABLE

(75) Inventors: Brian Hiatt, Anthem, AZ (US); Eric Stott, Phoenix, AZ (US)

(73) Assignee: R Cubed, L.L.C., Anthem, AZ (US)

( * ) Notice: Subject to any disclaimer, the term of this patent is extended or adjusted under 35 U.S.C. 154(b) by 0 days.

(21) Appl. No.: 12/542,986

(22) Filed: Aug. 18, 2009

(51) Int. Cl.
 *H01R 3/00* (2006.01)
(52) U.S. Cl. .................................................. 439/500
(58) Field of Classification Search ................. 439/500, 439/502, 121
 See application file for complete search history.

(56) References Cited

U.S. PATENT DOCUMENTS

| | | | | | |
|---|---|---|---|---|---|
| 3,201,742 | A * | 8/1965 | English | ...................... | 439/500 |
| 3,783,378 | A * | 1/1974 | Mildner | ...................... | 324/430 |
| 4,414,611 | A * | 11/1983 | Seltzer et al. | ............... | 362/183 |
| 4,835,410 | A * | 5/1989 | Bhagwat et al. | ............... | 307/64 |
| 4,847,513 | A * | 7/1989 | Katz et al. | ................... | 307/149 |
| 5,177,424 | A * | 1/1993 | Connors | ..................... | 320/114 |
| 5,200,685 | A * | 4/1993 | Sakamoto | ................. | 320/103 |
| 5,224,870 | A * | 7/1993 | Weaver et al. | ............... | 439/157 |
| 5,233,230 | A * | 8/1993 | Bonar | .......................... | 307/64 |
| 5,277,993 | A * | 1/1994 | Landers | ........................ | 429/10 |
| 5,296,315 | A * | 3/1994 | Rein | ........................... | 429/100 |
| 5,501,518 | A * | 3/1996 | Woodward | .................. | 702/120 |
| 5,594,314 | A * | 1/1997 | Hagiuda et al. | ............ | 320/110 |
| 5,687,387 | A * | 11/1997 | Endejan et al. | ................ | 710/2 |
| 6,528,969 | B2 * | 3/2003 | Tung et al. | ................... | 320/103 |
| 6,548,986 | B1 * | 4/2003 | Jakubowski | ................. | 320/111 |
| 7,018,233 | B1 * | 3/2006 | Griffin et al. | ................. | 439/504 |
| 7,144,255 | B2 * | 12/2006 | Seymour | ..................... | 439/49 |
| 7,148,698 | B2 * | 12/2006 | Becker et al. | ................ | 324/550 |
| 7,377,805 | B2 * | 5/2008 | Kim et al. | .................... | 439/502 |
| 7,530,851 | B2 * | 5/2009 | Parnis | .................... | 439/620.29 |
| 2003/0225317 | A1 * | 12/2003 | Schell | ......................... | 600/300 |
| 2003/0228792 | A1 * | 12/2003 | Lanni | ......................... | 439/528 |
| 2004/0085694 | A1 * | 5/2004 | Germagian et al. | ........... | 361/90 |
| 2004/0147823 | A1 * | 7/2004 | Kiani et al. | .................. | 600/323 |
| 2005/0123147 | A1 * | 6/2005 | Everett et al. | ................. | 381/79 |
| 2005/0243489 | A1 * | 11/2005 | Seymour | .................... | 361/93.1 |
| 2007/0155440 | A1 * | 7/2007 | Everett et al. | ............. | 455/569.2 |
| 2009/0045775 | A1 * | 2/2009 | Stanesti et al. | .............. | 320/126 |
| 2009/0269943 | A1 * | 10/2009 | Palli et al. | ...................... | 439/39 |

OTHER PUBLICATIONS

"Universal Serial Bus," available at: http:/en.wikipedia.org/wiki/universal Serial Bus, Aug. 7, 2009, p. 1-23.

* cited by examiner

*Primary Examiner*—T C Patel
*Assistant Examiner*—Vladimir Imas
(74) *Attorney, Agent, or Firm*—Adam R. Stephenson, Ltd.

(57) ABSTRACT

A power cable for an electronic device. Implementations may include a serial communication plug and one or more battery adaptors that each include a core including an electrical insulator where the core is coupled at a first end to a positive terminal and at a second end to a negative terminal. The positive terminal may be coupled to a diode coupled to the serial communication plug to which the negative terminal may be coupled. The one or more battery adaptors may be each configured to couple within one or more battery compartments included in an electronic device. The electronic device may receive power from the serial communication plug through the one or more battery adaptors when the one or more battery adaptors are coupled within the one or more battery compartments and when the serial communication plug is coupled within a serial communication receptacle of another electronic device.

1 Claim, 5 Drawing Sheets

SERIAL BUS POWER CABLE

BACKGROUND

1. Technical Field

Aspects of this document relate generally to cables used to connect various electronic devices and systems.

2. Background Art

A wide variety of conventional cable types exist that are adapted to connect to various electronic devices. Some cable types carry signals while others carry power to the device. Some cable types are adapted to interface with an electronic device in such a way that power and signal can be carried across a single cable simultaneously. Some cable types, such as parallel cables, are adapted to transport data from one electronic device to another in parallel flows of data bits or bytes; other cable types are adapted to transport data serially one bit or byte at a time. A wide variety of serial cable types and communication protocols exist; examples include Recommended Standard (RS)-232, IEEE 1394 (FireWire®), Universal Serial Bus (USB), Musical Instrument Digital Interface (MIDI), DMX512-A, and Ethernet.

SUMMARY

Implementations of a power cable for an electronic device may include a serial communication plug and one or more battery adaptors. The one or more battery adaptors may each include a core made of or including an electrical insulator where the core is coupled at a first end to a positive terminal and at a second end to a negative terminal. The positive terminal may be coupled to a diode coupled to the serial communication plug and the negative terminal may be coupled to the serial communication plug. The one or more battery adaptors may be each configured to couple within one or more battery compartments included in an electronic device. The electronic device may receive power from the serial communication plug through the one or more battery adaptors when the one or more battery adaptors are coupled within the one or more battery compartments and when the serial communication plug is coupled within a serial communication receptacle of another electronic device.

Implementations of a power cable may include one, all, or any of the following:

A resistor may be coupled to the diode between the diode and the serial communication plug.

The diode and the resistor may be included within the core.

The one or more battery adaptors may have substantially the dimensions of a battery selected from the group consisting of AAA, AA, C, and D battery sizes.

The diode may be included within the core.

The one or more battery adaptors may be removably coupled to the serial communication plug with an adapter.

The one or more battery adapters may be substantially the length of a battery selected from the group consisting of AAA, AA, C, and D battery sizes.

The one or more battery adapters may be sized to extend from a first end to a second end of a portion of a battery compartment which is configured to receive one battery selected from the group consisting of AAA, AA, C, and D battery sizes.

The one or more battery adapters may be sized to couple within a portion of a battery compartment that is equivalent to a length of a battery selected from the group consisting of AAA, AA, C, and D battery sizes.

Implementations of a battery adaptor for a power cable for an electronic device may include a cylindrical core including an electrical insulator where the cylindrical core has a first end and a second end opposing the first end. A positive terminal may be coupled at the first end of the cylindrical core and may include a cylindrical projection extending from a center of the positive terminal and may be adapted to engage within a battery compartment of an electronic device. A negative terminal may be coupled at the second end of the cylindrical core and may be adapted to engage within the battery compartment of the electronic device. The battery adaptor may be configured to provide power to the electronic device through a serial communication plug coupled with the battery adaptor when the battery adaptor is engaged within the battery compartment of the electronic device.

Implementations of a battery adaptor may include one, all, or any of the following:

The battery adaptor may have substantially the dimensions of a battery selected from the group consisting of AAA, AA, C, and D battery sizes.

The battery adaptor may be substantially the length of a battery selected from the group consisting of AAA, AA, C, and D battery sizes.

The battery adaptor may be sized to extend from a first end to a second end of a portion of a battery compartment which is configured to receive one battery selected from the group consisting of AAA, AA, C, and D battery sizes.

The battery adaptor may be sized to couple within a portion of a battery compartment that is equivalent to a length of a battery selected from the group consisting of AAA, AA, C, and D battery sizes.

Implementations of a power cable for an electronic device may include a serial communication plug and two battery adaptors. The two battery adaptors may each include a core including an electrical insulator where the core has a first end and a second end. A positive terminal may be coupled to the first end of the core and may include a cylindrical projection extending from a center of the positive terminal. A negative terminal may be coupled to the second end of the core. The positive terminals of the two battery adaptors may be connected in parallel with a diode coupled to the serial communication plug and the negative terminals may be coupled in parallel with the serial communication plug. The two battery adaptors may be each configured to couple within two battery compartments included in the electronic device.

Implementations of a power cable may include one, all, or any of the following:

A resistor may be coupled to the diode between the diode and the serial communication plug.

The diode and the resistor may be included within the core of one of the two battery adaptors.

The two battery adaptors may each have substantially the dimensions of a battery selected from the group consisting of AAA, AA, C, and D battery sizes.

The diode may be included within the core of one of the two battery adaptors.

The two battery adaptors may be removably coupled to the serial communication plug with an adapter.

The electrical device may be configured to use three batteries and the two battery adaptors may be configured to supply electrical power for the electrical device when the two battery adaptors are coupled within two of three battery compartments included in the electronic device and when the serial communication plug is coupled within a serial communication receptacle of another electronic device.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended serial bus power cable (power cable) and/or assembly procedures for a power cable will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such power cables and implementing components, consistent with the intended operation.

Figure 1:
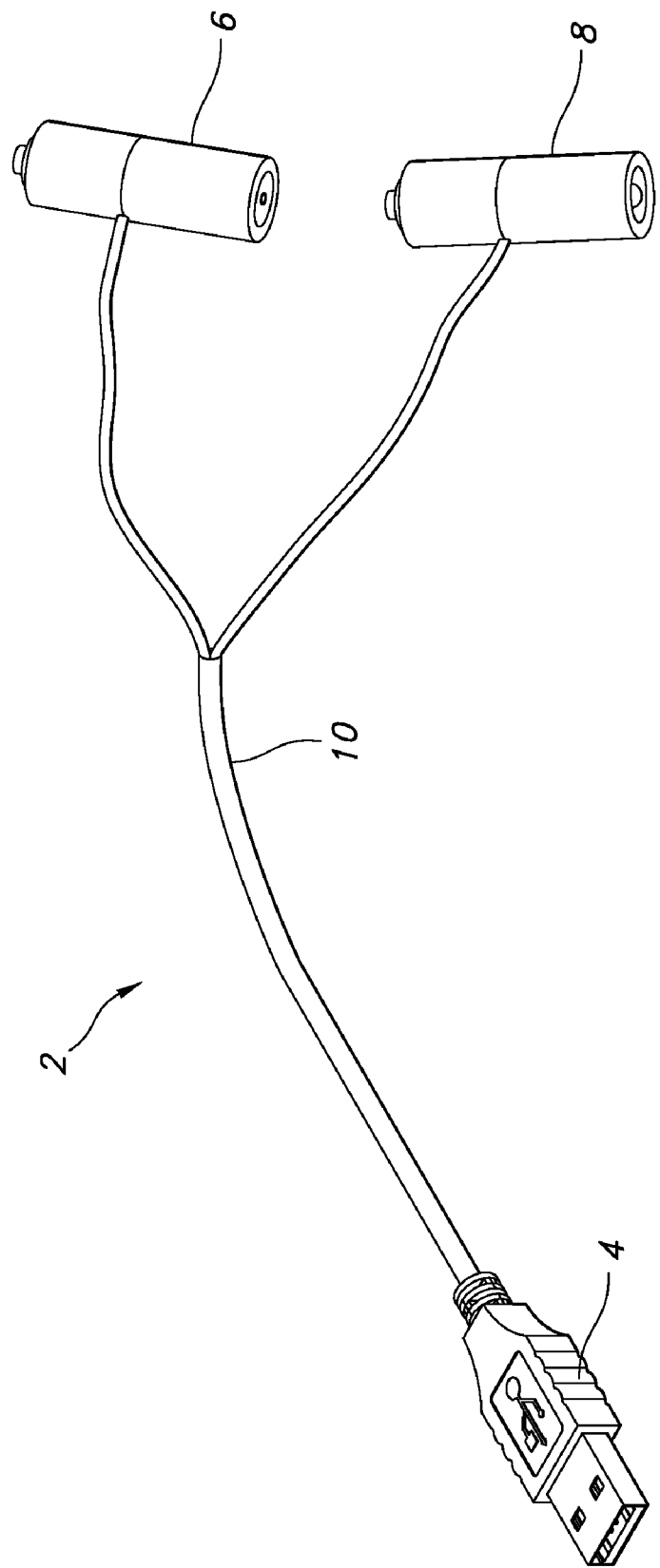
FIG. 1 is a perspective view of an implementation of a serial bus power cable (power cable)

Referring to FIG. 1, an implementation of a serial bus power cable (power cable) 2 is illustrated. As illustrated, the power cable 2 includes a serial communication plug 4 coupled to two battery adapters 6 and 8 using wire 10. The particular type of serial communication plug 4 utilized in implementations of power cables 2 may be any conventional serial communication type or communication standard, such as, by non-limiting example, IEEE 1394, Universal Serial Bus (USB), or Ethernet. In the implementation illustrated in FIG. 2, the serial communication plug 4 is a USB plug. In the USB communication standard, about 4.5 volts of power can be supplied by the cable to an electronic device. In electronic devices that operate wirelessly, such as wireless keyboards, mice, game controllers, and the like, power for the electronic device is often provided by batteries. Over time and through use of the electronic device, the charge in the batteries drains, causing erratic performance and eventual unusability of the device. Many wireless electronic devices also do not include any ports for connecting an external power supply, or, if an external power supply is available, the power supply must be plugged into a household wall receptacle. This may limit the user's flexibility when using the wireless electronic device to an area where the cord for the power supply will reach.

Figure 2A:
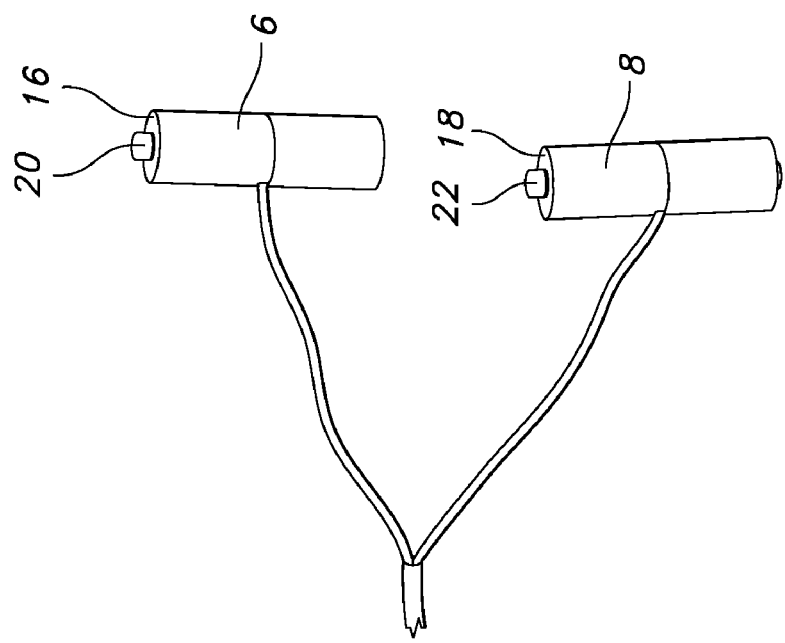
FIG. 2A is a perspective view of two battery adapter implementations showing the negative ends of the battery adapters.
Figure 2B:
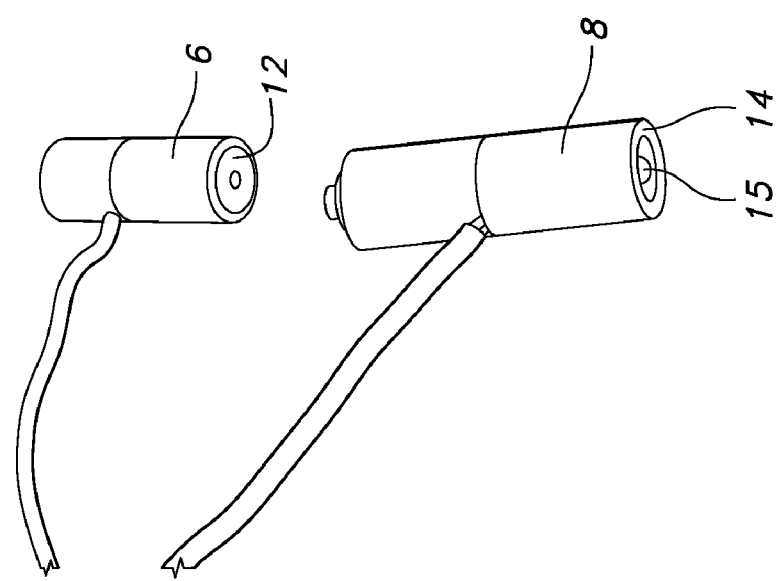
FIG. 2B is a perspective view of two battery adapters showing the positive ends of the battery adapter implementations.

Referring to FIG. 2A, a perspective view of the two battery adapters 6 and 8 from FIG. 1 is illustrated showing the negative ends (terminals) 12, 14 of the battery adapters 6, 8. As illustrated, the negative end 12 of the battery adapter 6 is flat, similar to the negative ends of a battery. The negative end 14 of battery adapter 14 includes a nipple 15 that extends from the surface of the negative end 14. The structures of the negative ends 12, 14 of the battery adapters 6, 8 allow the battery adapters 6, 8 to fit into the battery compartment of an electronic device that corresponds to the particular size of the battery adapters 6, 8. The battery adapters 6, 8 illustrated in FIG. 2A have substantially the dimensions of a AA battery, allowing them to fit into the corresponding portions of a battery compartment of an electronic device that is powered by AA batteries. Referring to FIG. 2B, a perspective view of the two battery adapters 6, 8 from FIG. 1 is illustrated showing the positive ends (terminals) 16, 18. The positive ends 16, 18 include cylindrical projections 20, 22 that extend from the center of the positive ends 16, 18, similar to the positive end of a battery and adapt the positive ends 16, 18 to fit into the battery compartment of an electronic device.

Because both the positive ends 16, 18, and negative ends 12, 14 of the battery adapters 6, 8 may have similar dimensions to the corresponding ends of a battery, the battery adapters 6, 8 may be able to couple into and be retained within the battery compartment of the electronic device while it is use. If the electronic device is wireless and has no port for connecting an external power supply (or if the external power supply would be inconvenient or impossible to use in a particular location), the user may insert the battery adapters 6, 8 into the battery compartment of the electronic device and plug the serial communication plug 4 into a corresponding serial communication receptacle in another electronic device. The electronic device into which the serial communication plug 4 may be inserted may be a computer, game console (such as an Xbox®, Wii®, or PlayStation®), or any other electrical device that includes a corresponding serial communication receptacle. Because many electrical devices include USB ports, the serial communication plug 4 may be particularly useful when it is a USB plug.

Figure 3:
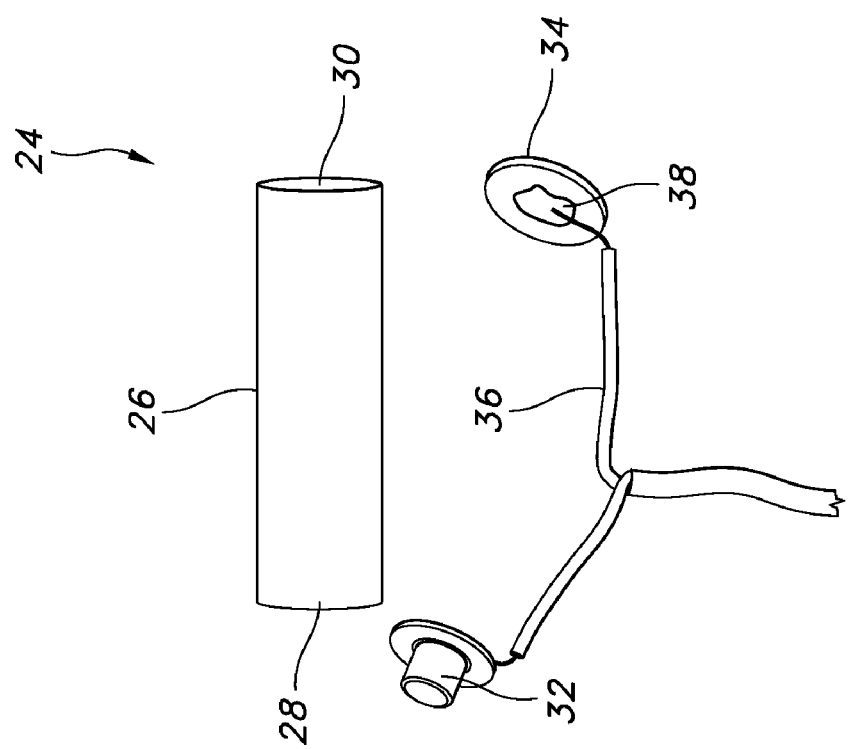
FIG. 3 is a perspective view of a partly disassembled battery adapter implementation.

Referring to FIG. 3, a partially exploded view of a battery adapter 24 is illustrated. As illustrated, the battery adapter 24 includes a electrically non-conductive or insulative core 26 that has a first end 28 and a second end 30. A positive terminal 32 is coupled to the first end 28 and a negative terminal 34 may be coupled to the second end 30. The positive terminal 32 and negative terminal 34 may be manufactured from any electrically conductive material, such as a metal. The core 26 may be manufactured from any electrically non-conductive material, such as, by non-limiting example, low density polyethylene, rubbers, thermoplastics, ceramics, or any other electrical insulator. As illustrated in FIG. 3, the positive terminal 32 and negative terminal 34 may be coupled to a wire 36 using solder 38. The positive terminal 32 and negative terminal 34 may be coupled to the core 26 using any of a wide variety of fastening techniques, including, by non-limiting example, shrink wrap, glue, snaps, tape, adhesives, or any other fastener method or type. In particular implementations, the same fastener that holds the positive terminal 32 and the negative terminal 34 to the core 26 may be used to hold and/or cover the wire 36 and the core 26.

The core 26 may be solid or hollow, and additional openings along the length of the core 26 may be included in particular implementations to allow insertion of and/or access to components located within the core 26. In various implementations, the cross-section of the core may also take on various shapes, including, by non-limiting example, circular, elliptical, square, rectangular, triangular, or any other closed shape. The shape of the cross-section of implementations of the core 26 may be constant across the length of the core, such as when the core 26 is uniformly cylindrical, or may vary across the length of the core 26. The dimensions of the core 26 for various battery sizes may be 1 and 5/8 inches long and 7/16 of an inch in diameter for a AAA sized battery adaptor, 1 and 13/16 inches long and 1/2 inch in diameter for a AAA sized battery adaptor, 1 and 7/8 inches long and 1 inch in diameter for a C sized battery adaptor, and 2 and 3/8 inches long and 1 and 5/16 inches in diameter for a D sized battery adaptor.

Figure 4:
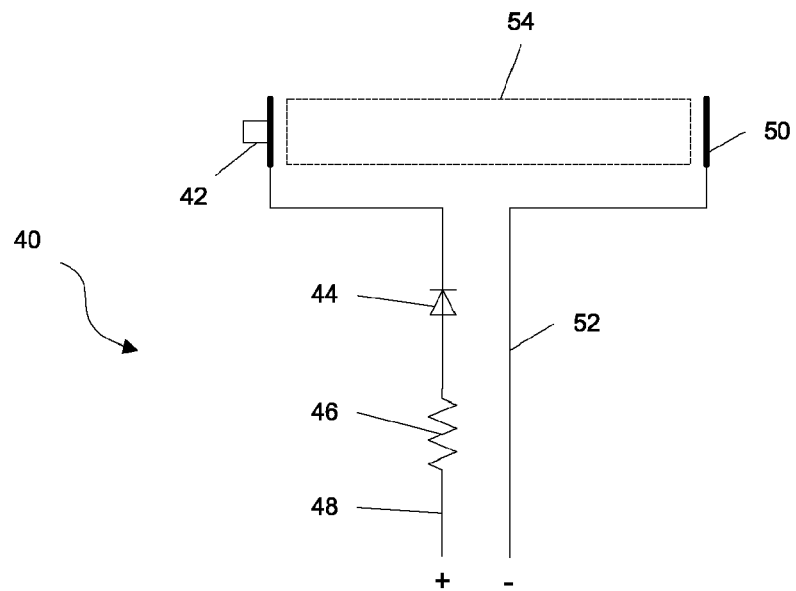
FIG. 4. is a schematic of the components of a single battery adapter implementation.

Referring to FIG. 4, a schematic of an implementation of a battery adapter 40 is illustrated. As illustrated, the battery adapter 40 includes positive terminal 42 coupled to diode 44 which is coupled to resistor 46 and then to the serial communication plug via wire 48. Negative terminal 50 is coupled to the serial communication plug directly via wire 52. In particular implementations, depending upon the output voltage desired from the battery adapter 40, the resistor 46 may not be included between the diode 44 and the serial communication plug. The diode 44 and resistor 46 may be included within the core 54 or may be located, either individually or collectively, outside the core 54. The schematic of a battery adapter 40 implementation illustrated in FIG. 4 may be used with any desired battery size type, including, by non-limiting example, AAA, AA, C, or D battery sizes. For the exemplary purposes of this disclosure, a AAA battery is about 1.75 inches in length and about 0.413 inches in diameter; a AA battery is about 1.99 inches in length and about 0.55 inches in diameter; a C battery is about 1.97 inches in length and about 1.03 inches in diameter; and a D battery is about 2.42 inches in length and about 1.35 inches in diameter. Various AA, AA, C, and D batteries may vary from the foregoing measurements depending upon a variety of factors, including, by non-limiting example, whether the battery size is an alkaline battery or rechargeable battery, battery manufacturer, nation of manufacture, and any other manufacturing or use characteristic.

Implementations of a battery adaptor 40 may have the length of a AAA, AA, C, or D battery, but may not have the same diameter along a portion or the entire length of the battery adaptor 40. Also, implementations of a battery adapter 40 may be sized to fit into a portion of a battery compartment that has a first end and a second end that is sized to receive one battery that is a AAA, AA, C, or D battery. Implementations of a battery adapter 40 may also be sized to fit into a portion of a battery compartment of an electrical device that is the length of a battery that is a AAA, AA, C, or D battery. For the exemplary purposes of this disclosure, if the desired output of the battery adapter 40 is 1.5 V when a USB plug is used as the power source, the diode 44 would be a 5 V diode and resistor 46 would have a resistance of 4.7 ohms and a power dissipation of 2.6 watts.

Figure 5:
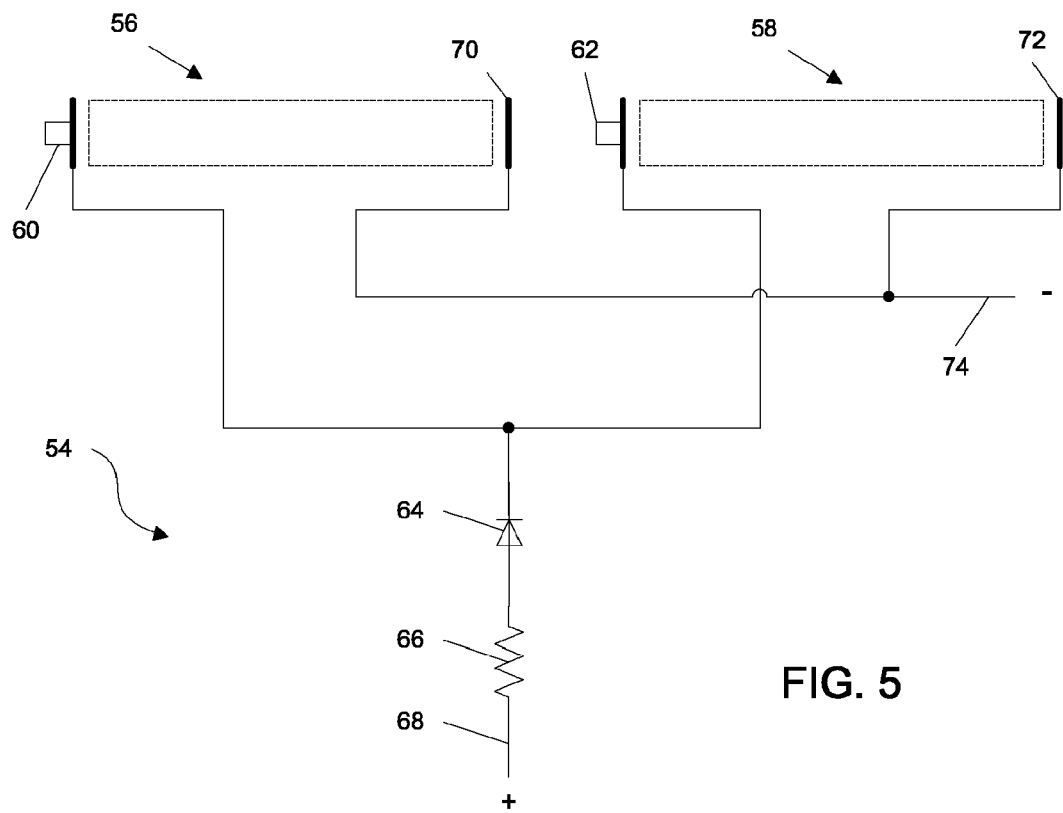
FIG. 5 is a schematic of the components of two battery adapter implementations.
Figure 6:
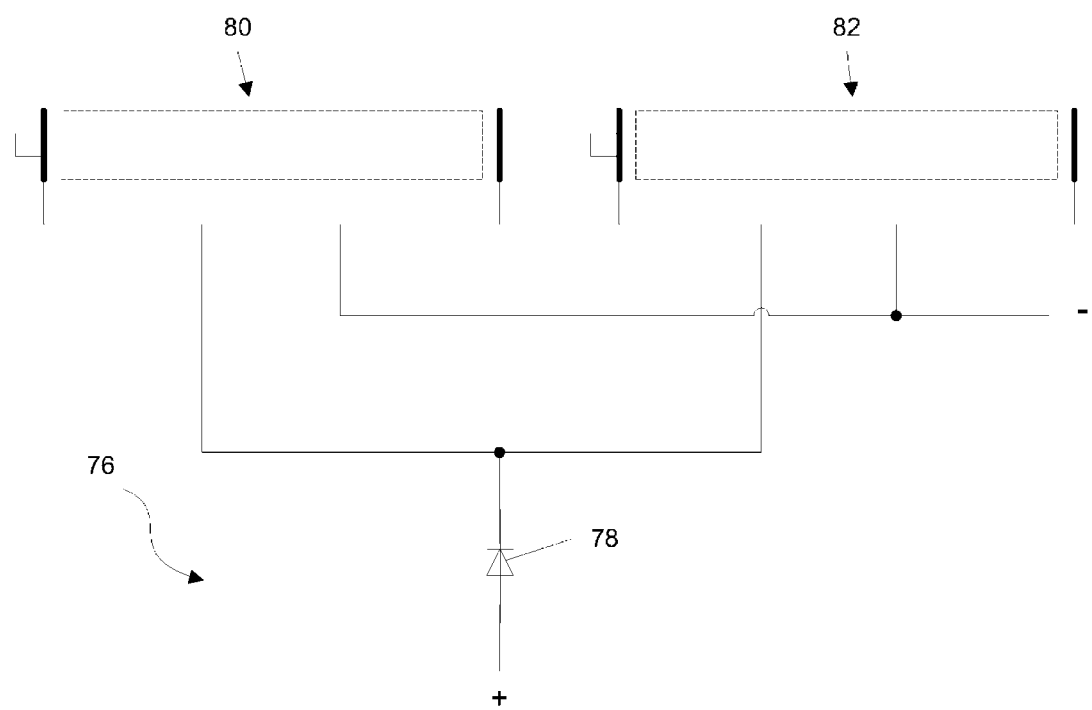
FIG. 6 is a schematic of the components of another two battery adapter implementations.

Referring to FIG. 5, a schematic of an implementation of a power cable 54 with two battery adapters 56, 58 is illustrated. As illustrated, the positive terminals 60, 62 of the two battery adapters 56, 58 are coupled in parallel with a diode 64 coupled to a resistor 66 and then to the serial communication plug via wire 68. The negative terminals 70, 72 are also coupled in parallel directly with the serial communication plug via wire 74. Depending upon the output voltage desired form the battery adapters 56, 58, the resistor 46 may not be included. For the exemplary purposes of this disclosure, if the desired output from the two battery adapters 56, 58 was 3 V and a USB plug is the power source, the diode 64 would be a 5 V diode and the resistor 66 would have a resistance of 2.7 ohms and a power dissipation of 1.5 watts. Also, if the desired output from the two battery adapters 56, 58 was 4 V, the resistor 66 would not be included and only a 5 V diode 64 would be used when a USB plug was the power source. A power cable 76 implementation with only a diode 78 and two battery adapters 80, 82 configured similarly to the battery adapters 56, 58 illustrated in FIG. 5 is illustrated in FIG. 6.

In particular implementations, because of the output voltage available from the battery adapters, only two battery adapters may be required to supply the power needed by an electronic device that otherwise uses three batteries. In these implementations, power could be provided to the electronic device by coupling the two battery adapters into two of the three available locations within the battery compartment of the electronic device and inserting the serial communication plug into another electronic device. Any number of desired battery adapters may be included as part of any particular power cable. Also, one or all of the battery adapters may be coupled to the serial communication plug using an adapter, such as a male/female adapter pair. This would allow the battery adapters to be removably coupled with the serial communication plug. Also, any of a wide variety of battery size converters could be utilized with implementations of battery adapters to allow a AAA size battery adapter, for example, to be reconfigured to fit into a AA sized battery compartment in an electronic device without requiring the use of a battery adapter of that size.

A wide variety of potential battery adapter size and voltage combinations are possible using the principles disclosed in this document. Table 1 includes an exemplary set of battery adapter sizes, battery adapter quantity, and voltage outputs.

| Battery Adapter Size/Quantity | Voltage Output |
| --- | --- |
| One AAA | 1.5 V |
| 2 AAA | 3 V |
| 2 AAA | 4.5 V |
| 1 AA | 1.5 V |
| 2 AA | 3 V |
| 2 AA | 4.5 V |
| 1 C | 1.5 V |
| 2 C | 3 V |
| 2 C | 4.5 V |
| 1 D | 1.5 V |
| 2 D | 3 V |
| 2 D | 4.5 V |

In places where the description above refers to particular implementations of power cables it should be readily apparent that a number of modifications may be made without departing from the spirit thereof and that these implementations may be applied to other power cable implementations.

The invention claimed is:

1. A power cable for an electronic device comprising:
    a serial communication plug; and
    two battery adaptors each comprising:
        a core comprising an electrical insulator, the core having a first end and a second end;
        a positive terminal coupled to the first end of the core, the positive terminal comprising a cylindrical projection extending from a center of the positive terminal; and
        a negative terminal coupled to the second end of the core;
    wherein the positive terminals of the two battery adaptors are connected in parallel with a diode coupled to the serial communication plug and the negative terminals are coupled in parallel with the serial communication plug;
    wherein the two battery adaptors are each configured to couple within two battery compartments included in the electronic device; and
    wherein the electronic device is configured to use three batteries and the two battery adaptors are configured to supply electrical power for the electronic device when the two battery adaptors are coupled within two of three battery compartments included in the electronic device and when the serial communication plug is coupled within a serial communication receptacle of another electronic device.

* * * * *